US010804771B2

(12) United States Patent
Uematsu et al.

(10) Patent No.: US 10,804,771 B2
(45) Date of Patent: Oct. 13, 2020

(54) ELECTRIC ACTUATOR AND ROTATION CONTROL MECHANISM (71) Applicant: NIDEC TOSOK CORPORATION, Kanagawa (JP)

(72) Inventors: Yutaka Uematsu, Kanagawa (JP); Jaehyun Kim, Kanagawa (JP); Toshiaki Nakamura, Kanagawa (JP); Shuichi Kinjo, Kanagawa (JP); Hiroshi Shirai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 104 days.

(21) Appl. No.: 16/232,084

(22) Filed: Dec. 26, 2018

(65) Prior Publication Data
US 2019/0199177 A1   Jun. 27, 2019

(30) Foreign Application Priority Data
Dec. 27, 2017   (JP) .................................. 2017-250983

(51) Int. Cl.
*H02K 11/215*   (2016.01)
*H02K 7/116*   (2006.01)
*B60K 17/344*   (2006.01)
*B60K 23/08*   (2006.01)

(52) U.S. Cl.
CPC .......... *H02K 11/215* (2016.01); *H02K 7/116* (2013.01); *B60K 17/344* (2013.01); *B60K 23/08* (2013.01)

(58) Field of Classification Search
USPC ........................................................ 475/149
See application file for complete search history.

(56) References Cited

U.S. PATENT DOCUMENTS

| 5,672,135 A * | 9/1997 | Hamada .................. F16H 59/36 |
| | | 310/68 B |
| 6,857,981 B2 * | 2/2005 | Hori ........................ F16H 61/32 |
| | | 475/149 |
| 2011/0016960 A1 * | 1/2011 | Debrailly ............. H02K 11/215 |
| | | 73/115.07 |
| 2019/0346022 A1 * | 11/2019 | Kamiya .................... F16H 1/32 |

(Continued)

FOREIGN PATENT DOCUMENTS

| JP | 2001112215 | 4/2001 |
| JP | 2008151628 | 7/2008 |

(Continued)

*Primary Examiner* — Dirk Wright
(74) *Attorney, Agent, or Firm* — JCIPRNET (57) ABSTRACT

This disclosure provides an electric actuator and a rotation control mechanism. The electric actuator includes: a motor; a speed reduction mechanism; an output part; and a rotation detection device. The output part extends in an axial direction and is disposed on one side in the axial direction with respect to a motor shaft of the motor. The rotation detection device has: a magnet that is fixed to the output part and extends in a circumferential direction of the output part; and a rotation sensor that faces the magnet in the axial direction or in a radial direction. The magnet has multiple magnetic poles disposed in the circumferential direction. At least one magnetic pole of the magnet is disposed at a predetermined angular position with respect to an angle reference position of the output part in a rotation direction.

11 Claims, 4 Drawing Sheets

(56) References Cited

U.S. PATENT DOCUMENTS

2019/0346023 A1* 11/2019 Kamiya .................... F16H 1/32
2020/0007010 A1* 1/2020 Shirai .................... H02K 7/003

FOREIGN PATENT DOCUMENTS

| JP | 2009229314 | 10/2009 |
| JP | 2012112897 | 6/2012 |
| JP | 2015023761 | 2/2015 |

* cited by examiner

ELECTRIC ACTUATOR AND ROTATION CONTROL MECHANISM

CROSS-REFERENCE TO RELATED APPLICATION

This application claims the priority of Japan patent application serial no. 2017-250983, filed on Dec. 27, 2017. The entirety of the above-mentioned patent application is hereby incorporated by reference herein and made a part of this specification.

BACKGROUND

Technical Field

The disclosure relates to an electric actuator and a rotation control mechanism.

Description of Related Art

Actuators with motors and speed reduction mechanisms are known. For example, in Japanese Patent Laid-Open No. 2001-112215, a conventional actuator is described and includes a rotation position detector that detects a rotation position of a rotating shaft of a motor. In addition, in Japanese Patent Laid-Open No. 2015-023761, there are electric actuators each with a potentiometer that detects a rotation angle of an output member that is linked to a speed reduction mechanism.

In an electric actuator, in a case where a sensor of a magnetism detection type is employed to detect a rotation angle of an output shaft rotating at a low speed, if a small magnet is used as a magnet attached to the output shaft, a weak magnetic field is generated, and thus detection accuracy of a rotation angle sensor deteriorates.

SUMMARY

An aspect of the disclosure provides an electric actuator that can prevent deterioration in accuracy of detection of a rotation angle of an output shaft, even when a magnet having a weak magnetic force is used.

According to an aspect of the disclosure, an electric actuator includes: a motor, having a motor shaft that extends in an axial direction; a speed reduction mechanism that is linked to a portion of the motor shaft on one side in the axial direction; an output part to which rotation of the motor shaft is transmitted via the speed reduction mechanism; and a rotation detection device that detects rotation of the output part. The output part extends in the axial direction and is disposed on the one side in the axial direction with respect to the motor shaft. The rotation detection device has: a magnet that is fixed to the output part and extends in a circumferential direction of the output part; and a rotation sensor that faces the magnet in the axial direction or a radial direction. The magnet has a plurality of magnetic poles disposed in the circumferential direction. At least one magnetic pole of the magnet is disposed at a predetermined angular position with respect to an angle reference position of the output part in a rotation direction.

In an embodiment of the disclosure, the electric actuator further includes: a positioning part that positions the magnet and the output part.

In an embodiment of the disclosure, the positioning part includes: a concave part, provided on a surface of the magnet; and a convex part, provided in the output part and inserted into the concave part.

In an embodiment of the disclosure, the concave part is positioned in a region of the magnet having a relatively low magnetic flux density in the circumferential direction.

In an embodiment of the disclosure, the magnet has only a pair of magnetic poles in the circumferential direction of the output part.

In an embodiment of the disclosure, the magnet is a ring magnet formed of a single member.

According to an aspect of the disclosure, a rotation control mechanism is provided and includes: the electric actuator mentioned above; a control shaft that is linked to the output part of the electric actuator; and an operating part that executes a different control operation with respect to a control object in accordance with a posture of the control shaft. The electric actuator is capable of switching the posture of the control shaft by stopping the output part at a plurality of angular positions within one rotation, and the rotation sensor is disposed in a range of an angle of 70° with respect to a magnetic pole of the magnet at the plurality of angular positions at which the output part stops.

In an embodiment of the disclosure, the rotation sensor is disposed in the range of the angle of 35° with respect to the magnetic pole of the magnet at the plurality of angular positions at which the output part stops.

The above and other elements, features, steps, characteristics and advantages of the present disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

Figure 1:
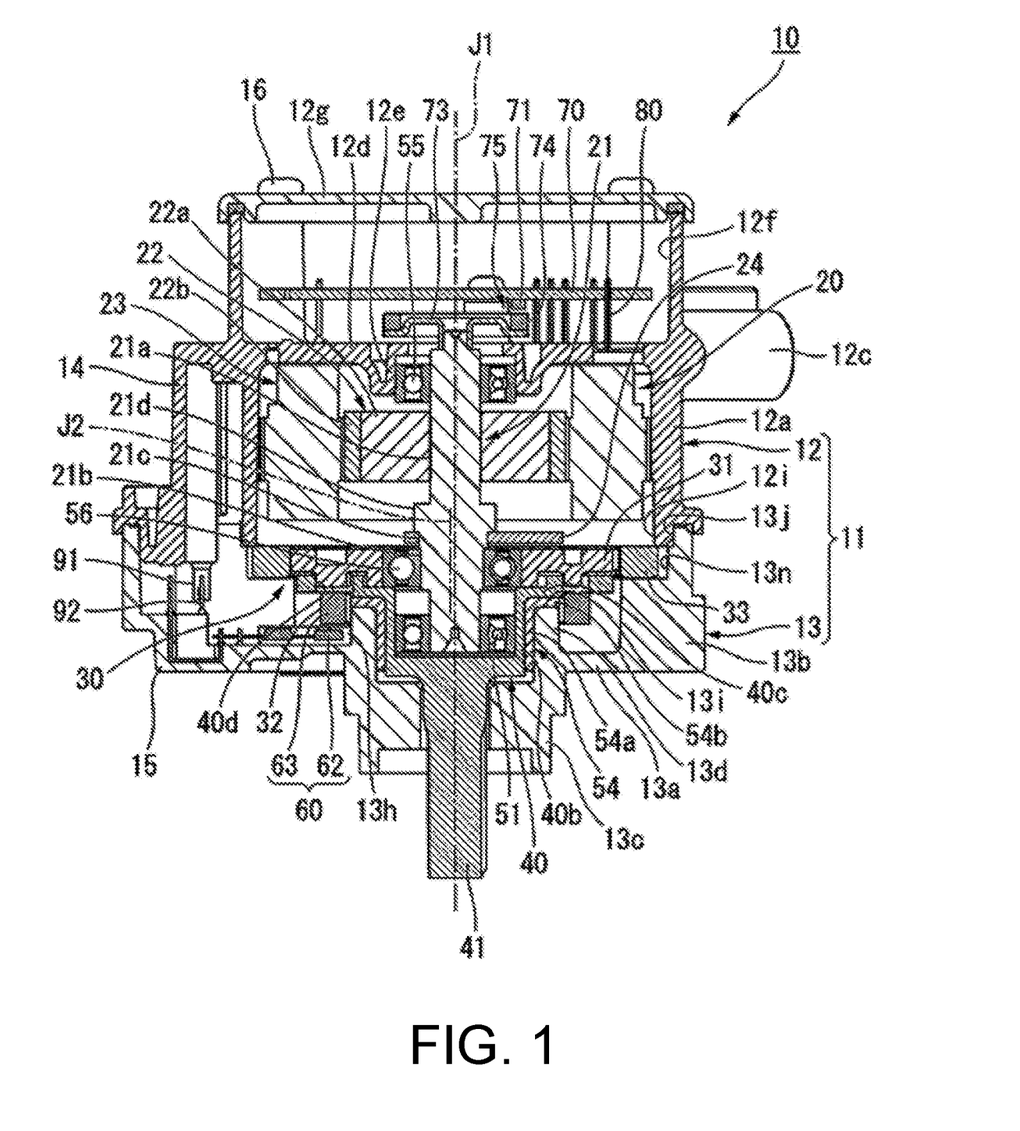
FIG. 1 is a diagram illustrating a longitudinal section of an electric actuator of an embodiment.
Figure 2:
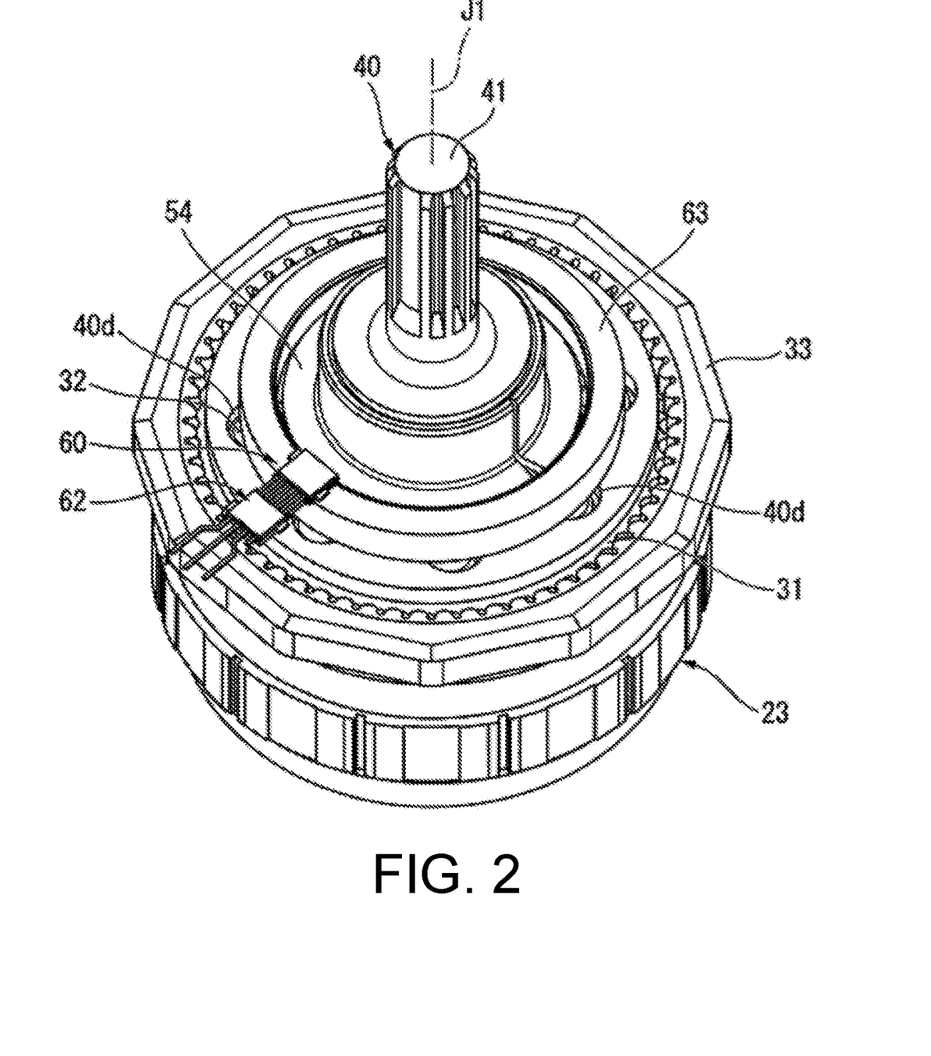
FIG. 2 is a perspective diagram illustrating an internal structure of the electric actuator viewed from the output shaft side.

An embodiment of the disclosure will be described below with reference to the drawings. As illustrated in FIG. 1 and FIG. 2, the electric actuator 10 of the present embodiment includes: a case 11, a motor 20, a speed reduction mechanism 30, an output part 40, a rotation detection device 60, a first wiring member 91, a second wiring member 92, a first bearing 51, a second bearing 54, a third bearing 55, and a fourth bearing 56. The motor 20 includes: a rotor 22, a stator 23, a control board 70, busbars 80, and a rotation detection part 75. The rotor 22 has a motor shaft 21 that extends along a first central axis (central axis) J1. That is, the motor 20 has the motor shaft 21. The speed reduction mechanism 30 is linked to the motor shaft 21.

The output part 40 has an output shaft part 41 that transmits rotation of the motor shaft 21 via the speed reduction mechanism 30. The output shaft part 41 extends in an axial direction of the first central axis J1. The output shaft part 41 is disposed at a position in the axial direction that is different from the position in an axial direction at which the motor shaft 21 is disposed. In this example of the present embodiment, an axial direction of the first central axis J1 is the top-bottom direction.

In the present embodiment, a direction that is parallel to the first central axis J1 will be simply referred to as an "axial direction." In an axial direction, the direction from the motor shaft 21 to the output shaft part 41 will be referred to as "one side in the axial direction", and the direction from the output shaft part 41 to the motor shaft 21 will be referred to as "the other side in the axial direction". The one side in the axial direction is the direction from the motor 20 to the speed reduction mechanism 30 and the output part 40 along the first central axis J1. The other side in the axial direction is the direction from the output part 40 and the speed reduction mechanism 30 to the motor 20 along the first central axis J1. In the example of the present embodiment, the one side in the axial direction is a lower side, which is the lower side of FIG. 1. The other side in the axial direction is an upper side, which is the upper side of FIG. 1. Note that an upper side and a lower side are just names for explaining relative positional relations between respective parts, and actual disposition relations and the like may include disposition relations other than those and the like indicated by such names.

A radial direction centered on the first central axis J1 will be simply referred to as a "radial direction." In a radial direction, the direction of approaching the first central axis J1 will be referred to as inward in the radial direction, and the direction away from the first central axis J1 will be referred to as outward in the radial direction. A circumferential direction around the first central axis J1 will be simply referred to as a "circumferential direction."

The case 11 houses the motor 20, the speed reduction mechanism 30, the output part 40, and the rotation detection device 60. The case 11 has a motor case 12 and a speed reduction mechanism case 13. The motor case 12 and the speed reduction mechanism case 13 are made of a resin. That is, the case 11 is made of a resin. The motor case 12 has a first opening 12i that opens on the one side in the axial direction. The speed reduction mechanism case 13 has a second opening 13j that opens on the other side in the axial direction. The case 11 is configured such that the motor case 12 and the speed reduction mechanism case 13 are fixed to each other with the openings facing each other in the axial direction. That is, the motor case 12 and the speed reduction mechanism case 13 are fixed to each other with the first opening 12i and the second opening 13j facing each other in the axial direction. In the state in which the motor case 12 and the speed reduction mechanism case 13 are fixed to each other, the inside of the first opening 12i and the inside of the second opening 13j communicate with each other.

The motor case 12 houses the motor 20, the first wiring member 91, and the third bearing 55. The motor case 12 has a circumferential wall part 12a, a lid 12g, a partition wall part 12d, a bearing holding part 12e, a connector part 12c, and a first wiring holding part 14.

The circumferential wall part 12a has a tubular shape extending in the axial direction with respect to the first central axis J1. The circumferential wall part 12a has a cylindrical shape. The circumferential wall part 12a has an end part opening on the one side in the axial direction. The circumferential wall part 12a has the other end part opening on the other side in the axial direction. One surface of the circumferential wall part 12a in the axial direction and the other surface thereof in the axial direction open respectively. That is, both sides of the circumferential wall part 12a open in the axial direction. The circumferential wall part 12a covers surroundings of the first central axis J1 along the first central axis J1.

The circumferential wall part 12a houses the stator 23. The circumferential wall part 12a surrounds the outer side of the stator 23 in the radial direction. The inside of the circumferential wall part 12a is partitioned by the partition wall part 12d, which will be described below, into a part on the one side in the axial direction and a part on the other side in the axial direction. The part of the inside of the circumferential wall part 12a on the one side in the axial direction from the partition wall part 12d serves as a stator housing part. The part of the inside of the circumferential wall part 12a on the other side in the axial direction from the partition wall part 12d serves as a control board housing part 12f. In the example of the present embodiment, an inner diameter of the control board housing part 12f is greater than an inner diameter of the stator housing part.

The lid 12g has a plate shape. The lid 12g closes the opening that opens on the circumferential wall part 12a on the other side in the axial direction. The lid 12g closes the opening of the control board housing part 12f on the other side in the axial direction. The lid 12g is detachably mounted on the circumferential wall part 12a using screws 16.

The partition wall part 12d has an annular plate shape widening inward in the radial direction from an inner circumferential surface of the circumferential wall part 12a. The partition wall part 12d covers the stator 23 from the other side in the axial direction. The partition wall part 12d is positioned between the rotor 22 and the stator 23, and the control board 70. The partition wall part 12d is disposed between the rotor 22 and the stator 23, and the control board 70 in the axial direction. The partition wall part 12d has a through hole that penetrates the partition wall part 12d in the axial direction. A coil wire, or the like, for example, passes through the through hole. The coil wire extends from a coil of the stator 23, which will be described below, passes through the through hole and is electrically connected to the control board 70.

The bearing holding part 12e has a tubular shape. The bearing holding part 12e extends in the axial direction with respect to the first central axis J1. The bearing holding part 12e is provided at an inner edge part of the partition wall part 12d in the radial direction. The third bearing 55 is fixed to the inner circumferential surface of the bearing holding part 12e. The bearing holding part 12e holds the third bearing 55.

The connector part 12c protrudes outward in the radial direction from an outer circumferential surface of the circumferential wall part 12a. The connector part 12c has a tubular shape extending in the radial direction. The connector part 12c opens outward in the radial direction. In the example of the present embodiment, the connector part 12c has a long cylindrical shape. A shape of the opening of the connector part 12c is a long circular shape with a length in the circumferential direction longer than a length in the axial direction. The connector part 12c is disposed at a position overlapping that of the partition wall part 12d in the radial direction. The connector part 12c holds the busbars 80 that extend from the control board 70 to the outside of the motor case 12. The connector part 12c is a part at which connection to electrical wiring outside the case 11 is made. The connector part 12c is connected to an external power supply (not illustrated).

The first wiring holding part 14 protrudes outward in the radial direction from the circumferential wall part 12a. The first wiring holding part 14 extends in the axial direction. The first wiring holding part 14 opens to the one side in the axial direction. The position of an end of the first wiring holding part 14 in the axial direction on the other side in the axial direction is the same as the position of the partition wall part 12*d* in the axial direction. The position of the first wiring holding part 14 in the circumferential direction is different from the position of the connector part 12*c* in the circumferential direction.

The speed reduction mechanism case 13 houses the speed reduction mechanism 30, the output part 40, the rotation detection device 60, the second wiring member 92, the first bearing 51, the second bearing 54, and the fourth bearing 56. The speed reduction mechanism case 13 has a bottom wall part 13*a*, a supporting tube part 13*d*, mounting wall parts 13*h*, a protruding tube part 13*c*, a cover tube part 13*b*, and a second wiring holding part 15.

The bottom wall part 13*a* has an annular plate shape centered on the first central axis J1. The bottom wall part 13*a* covers the speed reduction mechanism 30 from the one side in the axial direction. The surface of the bottom wall part 13*a* facing the other side in the axial direction faces the speed reduction mechanism 30 in the axial direction. The bottom wall part 13*a* is a part of the speed reduction mechanism 30 positioned on the one side in the axial direction among inner surfaces of the case 11. The supporting tube part 13*d* is provided on the bottom wall part 13*a*. The supporting tube part 13*d* has a tubular shape protruding from the surface of the bottom wall part 13*a* facing the other side in the axial direction to the other side in the axial direction. The supporting tube part 13*d* has a cylindrical shape. The supporting tube part 13*d* extends from an inner edge part of the bottom wall part 13*a* in the radial direction to the other side in the axial direction. The supporting tube part 13*d* opens to the other side in the axial direction. The end surface 13*i* of the supporting tube part 13*d* facing the other side in the axial direction has a planar shape widening perpendicular to the first central axis J1. The end surface 13*i* is an annular plane. The position of the end surface 13*i* in the axial direction is disposed at a position on the one side of the cover tube part 13*b*, which will be described below, in the axial direction, with respect to a position thereof in the axial direction on the other side in the axial direction.

The mounting wall parts 13*h* protrude from the surface of the bottom wall part 13*a* facing the other side in the axial direction to the other side in the axial direction. The mounting wall parts 13*h* extend outward in the radial direction from an outer circumferential surface of the supporting tube part 13*d*. The mounting wall parts 13*h* extend from the supporting tube part 13*d* into the second wiring holding part 15, which will be described below. An inner edge part of each mounting wall part 13*h* in the radial direction is connected to an outer circumferential surface of the supporting tube part 13*d*. An outer edge part of each mounting wall part 13*h* in the radial direction is disposed inside the second wiring holding part 15. The position of an outer edge part in the radial direction of the mounting wall part 13*h* in the radial direction is disposed on the outer side of the cover tube part 13*b*, which will be described below, in the radial direction, with respect to the position of the inner circumferential surface thereof in the radial direction. The surface of each mounting wall part 13*h* facing the other side in the axial direction is positioned on the one side in the axial direction from the end surface 13*i* of the supporting tube part 13*d*. Although not illustrated, a plurality of mounting wall parts 13*h* are provided on the surface of the bottom wall part 13*a* facing the other side in the axial direction, having intervals therebetween in the circumferential direction. In the example of the present embodiment, two mounting wall parts 13*h* form a pair, and pairs of the mounting wall parts 13*h* extend parallel to each other having uniform intervals therebetween. The mounting wall parts 13*h* are, for example, two ribs extending outward in the radial direction from the supporting tube part 13*d*. The mounting wall parts 13*h* are fixed having a first rotation sensor 62, which will be described below, interposed therebetween in the circumferential direction.

The protruding tube part 13*c* has a tubular shape protruding from an inner edge part of the bottom wall part 13*a* in the radial direction to the one side in the axial direction. The output shaft part 41 is disposed inside the protruding tube part 13*c*. The cover tube part 13*b* has a tubular shape protruding from the outer edge part of the bottom wall part 13*a* in the radial direction to the other side in the axial direction. The cover tube part 13*b* has a cylindrical shape. The cover tube part 13*b* opens toward the other side in the axial direction. The cover tube part 13*b* covers the surroundings of the first central axis J1 along the first central axis J1. The end part of the cover tube part 13*b* on the other side in the axial direction comes in contact with and is fixed to the end part of the circumferential wall part 12*a* on the one side in the axial direction.

The second wiring holding part 15 protrudes outward in the radial direction from the cover tube part 13*b*. The second wiring holding part 15 has a box shape opening to the other side in the axial direction. The inside of the second wiring holding part 15 communicates with the inside of the cover tube part 13*b*. The position of the end part of the second wiring holding part 15 in the axial direction on the one side in the axial direction is the same as the position of the bottom wall part 13*a* in the axial direction. The second wiring holding part 15 faces the first wiring holding part 14 in the axial direction. The inside of the second wiring holding part 15 communicates with the inside of the first wiring holding part 14.

The rotor 22 has the motor shaft 21, a rotor core 22*a*, a rotor magnet 22*b*, and a balance weight 24. The motor shaft 21 is supported by the first bearing 51 and the third bearing 55 to be rotatable around the first central axis J1. The first bearing 51 fits to the end part of the motor shaft 21 on the one side in the axial direction. The third bearing 55 fits to a part of the motor shaft 21 on the other side in the axial direction. The motor shaft 21 and the speed reduction mechanism 30 are linked to each other via the fourth bearing 56 such that both can rotate around a second central axis J2. The fourth bearing 56 is disposed between the first bearing 51 and the third bearing 55 in the axial direction and fits to the motor shaft 21. The first bearing 51, the third bearing 55, and the fourth bearing 56 are, for example, ball bearings. The end part of the motor shaft 21 on the other side in the axial direction protrudes from an inner side of the bearing holding part 12*e* to the other side in the axial direction. The end part of the motor shaft 21 on the other side in the axial direction protrudes to the other side in the axial direction from the partition wall part 12*d*.

The motor shaft 21 has a rotor core fixing shaft part 21*a*, an eccentric shaft part 21*b*, a weight mounting shaft part 21*c*, and a large diameter part 21*d*. The rotor core fixing shaft part 21*a* extends in the axial direction with respect to the first central axis J1. The rotor core is fixed to the outer circumferential surface of the rotor core fixing shaft part 21*a*. The third bearing 55 fits to a part of the rotor core fixing shaft part 21*a* on the other side in the axial direction from the rotor core 22*a*.

The eccentric shaft part 21*b* is positioned on the one side in the axial direction from the rotor core fixing shaft part 21a. The eccentric shaft part 21b is eccentric with respect to the first central axis J1. The eccentric shaft part 21b extends with respect to the second central axis J2 eccentric with respect to the first central axis J1. The second central axis J2 is parallel to the first central axis J1. Thus, the eccentric shaft part 21b extends in the axial direction. An inner diameter side of the fourth bearing 56 fits to the eccentric shaft part 21b. The eccentric shaft part 21b rotatably supports an external tooth gear 31 of the speed reduction mechanism 30, which will be described below, via the fourth bearing 56.

The weight mounting shaft part 21c is disposed between the rotor core fixing shaft part 21a and the eccentric shaft part 21b in the axial direction. The weight mounting shaft part 21c is positioned on the other side in the axial direction with respect to the eccentric shaft part 21b. The weight mounting shaft part 21c has a larger diameter than the eccentric shaft part 21b. The weight mounting shaft part 21c is disposed adjacent to the other side in the axial direction of the fourth bearing 56, and thus the end part of the weight mounting shaft part 21c on the one side in the axial direction faces an inner ring of the fourth bearing 56 in the axial direction.

The large diameter part 21d is disposed on the other side in the axial direction with respect to the weight mounting shaft part 21c. The large diameter part 21d is positioned on the other side in the axial direction with respect to the weight mounting shaft part 21c. The large diameter part 21d is disposed on the one side in the axial direction with respect to the rotor core fixing shaft part 21a. The large diameter part 21d is positioned on the one side in the axial direction with respect to the rotor core fixing shaft part 21a. The large diameter part 21d has a larger diameter than the weight mounting shaft part 21c. In the example of the present embodiment, the large diameter part 21d is the part having the largest diameter in the motor shaft 21.

The rotor core 22a has a tubular shape and is fixed to an external circumferential surface of the rotor core fixing shaft part 21a. The rotor magnet 22b is fixed to an external circumferential surface of the rotor core 22a. The balance weight 24 is fixed to the weight mounting shaft part 21c.

The stator 23 faces the rotor 22 having a gap in the diameter direction therebetween. The stator 23 has an annular stator core that surrounds the outer side of the rotor 22 in the radial direction and a plurality of coils mounted on the stator core. Although not illustrated, the stator core has a back yoke and teeth. The back yoke has an annular shape extending in the circumferential direction. A plurality of teeth are disposed having gaps therebetween in the circumferential direction, extending from the back yoke to the inner side in the radial direction.

The control board 70 has a plate shape. The plate surfaces of the control board 70 face in the axial direction and extend vertical to the axial direction. The control board 70 is housed in the control board housing part 12f. The control board 70 is disposed on the other side in the axial direction with respect to the partition wall part 12d. In the example of the present embodiment, the control board 70 is disposed apart from the partition wall part 12d on the other side in the axial direction. The control board 70 is electrically connected to the stator 23. The control board 70 is connected to coil wires of the coils of the stator 23. The control board 70 has, for example, an inverter circuit mounted thereon.

The busbars 80 are held by the connector part 12c. The busbars 80 are embedded into the connector part 12c. First end parts of both end parts of the busbars 80 are fixed to the control board 70. Second end parts of both end parts of the busbars 80 are disposed in openings on the outer side of the connector part 12c in the radial direction and are exposed to the outside of the case 11. The busbars 80 are electrically connected to an external power supply that is connected to the connector part 12c. Power is supplied from the external power supply to the coils of the stator 23 through the busbars 80 and the control board 70.

The rotation detection part 75 detects rotation of the rotor 22. The rotation detection part 75 is disposed inside the control board housing part 12f. The rotation detection part 75 is disposed in a space between the partition wall part 12d and the control board 70. The rotation detection part 75 has a mounting member 73, a second magnet 74, and second rotation sensors 71.

The mounting member 73 is made of, for example, a non-magnetic material. Note that the mounting member 73 may be made of a magnetic material. The mounting member 73 has an annular shape centered on the first central axis J1. An inner circumferential surface of the mounting member 73 is fixed to an end of an outer circumferential surface of the motor shaft 21 on the other side in the axial direction. The mounting member 73 is disposed on the other side in the axial direction with respect to the third bearing 55 and the bearing holding part 12e. An outer edge part of the mounting member 73 in the radial direction is positioned on the one side in the axial direction with respect to the part on the inner side in the radial direction of the outer edge part thereof in the radial direction.

The second magnet 74 has an annular shape extending in the circumferential direction. The second magnet 74 has an annular plate shape centered on the first central axis J1. The plate surfaces of the second magnet 74 face in the axial direction and extends vertically to the axial direction. The second magnet 74 has the N pole and the S pole alternately disposed in the circumferential direction. The second magnet 74 is mounted on the mounting member 73. The second magnet 74 is fixed to the surface of the outer edge part of the mounting member 73 in the radial direction, facing the other side in the axial direction. The second magnet 74 is fixed to the mounting member 73 using, for example, an adhesive, or the like. The other side in the axial direction and the outer side of the radial direction of the second magnet 74 are covered by a magnet cover. The mounting member 73 and the second magnet 74 rotate around the first central axis J1 together with the motor shaft 21.

The second rotation sensors 71 face the second magnet 74 having a gap therebetween. The second rotation sensors 71 face the second magnet 74 in the axial direction. The second rotation sensors 71 are positioned on the other side in the axial direction with respect to the second magnet 74. The second rotation sensors 71 detect a magnetic field generated by the second magnet 74. The second rotation sensors 71 are, for example, Hall elements. A plurality of second rotation sensors 71 are provided in the circumferential direction having equal intervals therebetween. For example, three second rotation sensors 71 are provided in the circumferential direction having intervals of the angle of 120 degrees therebetween.

The speed reduction mechanism 30 is linked to a part of the motor shaft 21 on the one side in the axial direction. The speed reduction mechanism 30 is disposed on the outer side of the radial direction of the part of the motor shaft 21 on the one side in the axial direction. The speed reduction mechanism 30 is disposed at the position overlapping the eccentric shaft part 21b when it is viewed in the radial direction. The speed reduction mechanism 30 is disposed between the bottom wall part 13a and the stator 23 in the axial direction.

The speed reduction mechanism 30 has an external tooth gear 31, an internal tooth gear 33, and an annular plate part 40c. The external tooth gear 31 has a substantially annular plate shape centered on the second central axis J2. The plate surfaces of the external tooth gear 31 face in the axial direction and extends vertically to the axial direction. A gear part is provided on an outer circumferential surface of the external tooth gear 31. The external tooth gear 31 is connected to the eccentric shaft part 21b via the fourth bearing 56. That is, the speed reduction mechanism 30 is linked to the motor shaft 21 via the fourth bearing 56. The fourth bearing 56 fits into the external tooth gear 31. The fourth bearing 56 links the motor shaft 21 to the external tooth gear 31 such that they can rotate around the second central axis J2.

The external tooth gear 31 has a plurality of pins 32. The pins 32 have a columnar shape protruding from the surface of the external tooth gear 31 toward the one side in the axial direction facing the one side in the axial direction. The plurality of pins 32 are disposed around the second central axis J2 at equal intervals in the circumferential direction. In the example of the present embodiment, eight pins 32 are provided.

The internal tooth gear 33 is fixed to the speed reduction mechanism case 13, surrounding the outer side of the external tooth gear 31 in the radial direction. The internal tooth gear 33 has an annular shape centered on the first central axis J1. The internal tooth gear 33 is disposed in a recess part 13n on the inner circumferential surface of the cover tube part 13b and is fixed to the cover tube part 13b. The recess part 13n is disposed at an end part of the inner circumferential surface of the cover tube part 13b on the other side in the axial direction and opens to the other side in the axial direction and the inner side in the radial direction.

The internal tooth gear 33 meshes with the external tooth gear 31. A gear part is provided on the inner circumferential surface of the internal tooth gear 33. The gear part of the internal tooth gear 33 meshes with the gear part of the external tooth gear 31. The gear part of the internal tooth gear 33 meshes with the gear part of the external tooth gear 31 at a part in the circumferential direction (the left part in each of FIG. 2 and FIG. 3). The number of teeth of the gear part of the internal tooth gear 33 is different from that of the gear part of the external tooth gear 31. The number of teeth of the gear part of the internal tooth gear 33 is greater than that of the gear part of the external tooth gear 31.

The annular plate part 40c is a part of the output part 40. The annular plate part 40c is a linking part that links the speed reduction mechanism 30 to the output part 40. The annular plate part 40c is disposed on the one side in the axial direction with respect to the external tooth gear 31. The annular plate part 40c has an annular plate shape centered on the first central axis J1. The part on the outer side of the annular plate part 40c in the radial direction is positioned on the other side in the axial direction from the part thereof on the inner side in the radial direction. The part on the outer side of the annular plate part 40c in the radial direction is thicker in the axial direction than the part of the annular plate part 40c on the inner side in the radial direction. The annular plate part 40c has a plurality of holes 40d penetrating the annular plate part 40c in the axial direction. The holes 40d are disposed at parts of the annular plate part 40c on the outer side in the radial direction.

As illustrated in FIG. 1 and FIG. 2, the plurality of holes 40d are disposed around the first central axis J1 in the circumferential direction at equal intervals. In the example of the present embodiment, eight holes 40d are provided. The number of holes 40d is the same as that of the pins 32. The holes 40d have a circular hole shape. An inner diameter of each of the holes 40d is greater than the outer diameter of each of the pins 32. The plurality of pins 32 are each inserted into the plurality of holes 40d. The outer circumferential surfaces of the pins 32 make internal contact with the inner circumferential surfaces of holes 40d. That is, the outer circumferential surfaces of the pins 32 and the inner circumferential surfaces of the holes 40d are in contact with each other at parts of the circumferential surfaces. The inner circumferential surfaces of the holes 40d support the external tooth gear 31 via the pins 32 such that the external tooth gear 31 can swing.

The output part 40 is the part that outputs a driving force of the electric actuator 10. As illustrated in FIG. 1, the output part 40 has a tubular wall part 40b, the annular plate part 40c, and the output shaft part 41. The tubular wall part 40b has a tubular shape extending in the axial direction with respect to the first central axis J1. The tubular wall part 40b has a cylindrical shape extending from an inner edge part of the annular plate part 40c in the radial direction to the one side in the axial direction. The tubular wall part 40b has a bottomed cylindrical shape opening to the other side in the axial direction. The first bearing 51 fits to the end part of the inner circumferential surface of the tubular wall part 40b on the one side in the axial direction. Accordingly, the first bearing 51 links the motor shaft 21 to the output part 40 such that they can rotate with respect to each other. The first bearing 51 links the motor shaft 21 to the output part 40 such that they can rotate with respect to each other around the first central axis J1. The end part of the motor shaft 21 on the one side in the axial direction is positioned inside the tubular wall part 40b. The end surface of the motor shaft 21 facing the one side in the axial direction faces the surface of the bottom of the tubular wall part 40b facing the other side in the axial direction having a gap therebetween.

The tubular wall part 40b is disposed inside the supporting tube part 13d. The second bearing 54 is disposed between the tubular wall part 40b and the supporting tube part 13d. The second bearing 54 fits to the supporting tube part 13d. That is, the second bearing 54 fits to the inside of the supporting tube part 13d. The tubular wall part 40b fits to the inside of the second bearing 54. The second bearing 54 is sandwiched between the outer circumferential surface of the tubular wall part 40b and the inner circumferential surface of the supporting tube part 13d. The second bearing 54 supports the output part 40 with respect to the case 11 such that the output part 40 can rotate.

The second bearing 54 has a bearing tube part 54a and a bearing flange part 54b. The bearing tube part 54a has a cylindrical shape extending in the axial direction with respect to the first central axis J1. The bearing tube part 54a is sandwiched between the tubular wall part 40b and the supporting tube part 13d in the radial direction.

The bearing flange part 54b has an annular plate shape centered on the first central axis J1. The bearing flange part 54b extends from the end part of the bearing tube part 54a on the other side in the axial direction to the outer side in the radial direction. A plate surface of the bearing flange part 54b faces in the axial direction and extends vertically to the axial direction. The bearing flange part 54b is sandwiched between the end surface 13i facing the other side in the axial direction with respect to the supporting tube part 13d and the annular plate part 40c in the axial direction.

The output shaft part 41 extends in the axial direction and is disposed on the one side in the axial direction with respect to the motor shaft 21. The output shaft part 41 has a columnar shape centered on the first central axis J1. The output shaft part 41 extends from the bottom of the tubular wall part 40b to the one side in the axial direction. The output shaft part 41 is inserted into the protruding tube part 13c. The part of the output shaft part 41 on the one side in the axial direction protrudes to the one side in the axial direction from the protruding tube part 13c. The part of the output shaft part 41 on the one side in the axial direction has another member to which a driving force of the electric actuator 10 is output mounted thereon. The output part 40 is a single member in the present embodiment.

When the motor shaft 21 rotates around the first central axis J1, the eccentric shaft part 21b (the second central axis J2) revolves around the first central axis J1 in the circumferential direction. The revolution of the eccentric shaft part 21b is transmitted to the external tooth gear 31 via the fourth bearing 56, and the external tooth gear 31 revolves around the first central axis J1 in the internal tooth gear 33. The external tooth gear 31 swings while the positions at which the inner circumferential surfaces of holes 40d and the outer circumferential surfaces of the pins 32 make internal contact change. At this time, the position at which the gear part of the external tooth gear 31 meshes with the gear part of the internal tooth gear 33 changes in the circumferential direction. The number of teeth of the external tooth gear 31 is different from that of the internal tooth gear 33, and the internal tooth gear 33 is fixed to the speed reduction mechanism case 13 and thus not rotate. For this reason, the external tooth gear 31 rotates around the second central axis J2 with respect to the internal tooth gear 33.

The direction in which the external tooth gear 31 rotates is opposite to the direction in which the motor shaft 21 rotates. The rotation (rotation) of the external tooth gear 31 around the second central axis J2 is transmitted to the annular plate part 40c via the holes 40d and the pins 32. Accordingly, the annular plate part 40c rotates around the first central axis J1 and the output part 40 rotates around the first central axis J1. As described above, the rotation of the motor shaft 21 is transmitted to the output shaft part 41 via the speed reduction mechanism 30.

The rotation of the output part 40 is decelerated by the speed reduction mechanism 30 in comparison to rotation of the motor shaft 21. Specifically, for the speed reduction mechanism 30 of the present embodiment, a speed reduction ratio R of rotation of the output part 40 to rotation of the motor shaft 21 is represented by $R=-(N2-N1)/N2$. The negative symbol at the head on the right side of the formula expressing the speed reduction ratio R indicates that the rotation direction of the output part 40 that is subject to speed reduction is opposite to the rotation direction of the motor shaft 21. N1 denotes the number of teeth of the external tooth gear 31, and N2 denotes the number of teeth of the internal tooth gear 33. As an example, when the number of teeth N1 of the external tooth gear 31 is 59 and the number of teeth N2 of the internal tooth gear 33 is 60, the speed reduction ratio R is $-1/60$. As described above, the speed reduction mechanism 30 of the present embodiment can have a high speed reduction ratio R of rotation of the output part 40 to rotation of the motor shaft 21. Accordingly, a rotation torque of the output part 40 can be large.

The rotation detection device 60 detects rotation of the output part 40. As illustrated in FIG. 1 and FIG. 2, the rotation detection device 60 has a first magnet 63 and a first rotation sensor 62. The rotation detection device 60 is disposed between the bottom wall part 13a and the annular plate part 40c on the outer side of the supporting tube part 13d in the radial direction, as illustrated in FIG. 1. Accordingly, a length of the electric actuator 10 in the axial direction can be restricted.

The first magnet 63 has an annular shape extending in the circumferential direction. The first magnet 63 has a cylindrical shape centered on the first central axis J1. The first magnet 63 has a plurality of magnetic poles disposed in the circumferential direction. In the case of the present embodiment, the first magnet 63 has one N pole and one S pole disposed on the surface of the one side in the axial direction in the circumferential direction. The first magnet 63 is ring magnet having two poles on a single side in the circumferential direction. The first magnet 63 is a ring magnet formed of a single member. That is, a relatively inexpensive magnet can be used as the first magnet 63.

The first magnet 63 is fixed to the output part 40. The first magnet 63 is fixed to the surface of the annular plate part 40c on the one side in the axial direction. The first magnet 63 rotates around the first central axis J1 along with the annular plate part 40c.

The first rotation sensor 62 faces the first magnet 63 having a gap therebetween. The first rotation sensor 62 faces the first magnet 63 in the axial direction. The first rotation sensor 62 is positioned on the one side in the axial direction with respect to the first magnet 63. The first rotation sensor 62 detects a magnetic field generated by the first magnet 63. The first rotation sensor 62 is, for example, a Hall element. A magnetic field at the position of the first rotation sensor 62 changes in accordance with rotation of the first magnet 63 together with the output part 40. When the first rotation sensor 62 detects the change of the magnetic field, rotation of the output part 40 can be detected. The first rotation sensor 62 can detect a rotational angular position of the output part 40 with respect to the case 11 in the circumferential direction. The first rotation sensor 62 may also be called, for example, a rotational angular position detection sensor, a rotational angle sensor, or the like.

The first rotation sensor 62 is disposed at a position overlapping the supporting tube part 13d when it is viewed from the radial direction. The first rotation sensor 62 is disposed at the position facing the outer side in the radial direction from the supporting tube part 13d. The first rotation sensor 62 is positioned on the other side in the axial direction from the bottom wall part 13a. The first rotation sensor 62 is disposed between the bottom wall part 13a and the first magnet 63. The first rotation sensor 62 is mounted to the mounting wall parts 13h. The first rotation sensor 62 is held by the mounting wall parts 13h. Since the first rotation sensor 62 is mounted to the mounting wall parts 13h, the first rotation sensor 62 can stably perform detection. The first rotation sensor 62 has three sensor terminals as illustrated in FIG. 2. The three sensor terminals are a sensor terminal for power supply, a sensor terminal for signal transmission, and a sensor terminal for grounding. The three sensor terminals are connected to the control board 70 via the second wiring member 92 and the first wiring member 91.

In the present embodiment, at least one magnetic pole of the first magnet 63 is disposed at a predetermined angular position a with respect to an angle reference position of the output part 40 in the rotation direction. That is, the first magnet 63 and the output part 40 are fixed to each other in a positioned state. In the present embodiment, the positions of the N pole and the S pole of the first magnet 63 are fixed to the angle reference position of the output part 40 in a positioned state.

The first magnet 63 has a concave part 63a that is concave from an inner circumferential surface to an outer side in the radial direction. The output part 40 has a convex part 40e protruding from the surface of the annular plate part 40c on the one side in the axial direction to the one side in the axial direction. When the convex part 40e is inserted into the concave part 63a, the first magnet 63 and the output part 40 are positioned in the circumferential direction. Thus, the electric actuator 10 has a positioning part 34 including the concave part 63a and the convex part 40e. Having the positioning part 34, the first magnet 63 can be easily disposed at the predetermined position. Accordingly, work of assembling the electric actuator 10 is easy.

The concave part 63a of the first magnet 63 is positioned in an area of the first magnet 63 in the circumferential direction in which a magnetic flux density is relatively low. In the present embodiment, the concave part 63a is disposed at an inner circumferential part of the angular position of the first magnet 63 shifted by 90° from the position of the N pole. Since the N pole and the S pole of the first magnet 63 are positioned at opposite sides in the radial direction with respect to the first central axis J1, the position shifted by 90° from the N pole has the lowest magnetic flux density in the first magnet 63.

Since the volume of the first magnet 63 is small at the position at which the concave part 63a is provided, the magnetic flux density decreases. Thus, by disposing the concave part 63a at the part of the first magnet 63 having a low magnetic flux density, the first magnet 63 and the output part 40 can be positioned without lowering the magnetic flux density around the N pole and the S pole. With this configuration, even when a small magnet having a weak magnetic force is used, the rotation detection device 60 that is less likely to cause malfunction in detection of an angle can be obtained.

Figure 3:
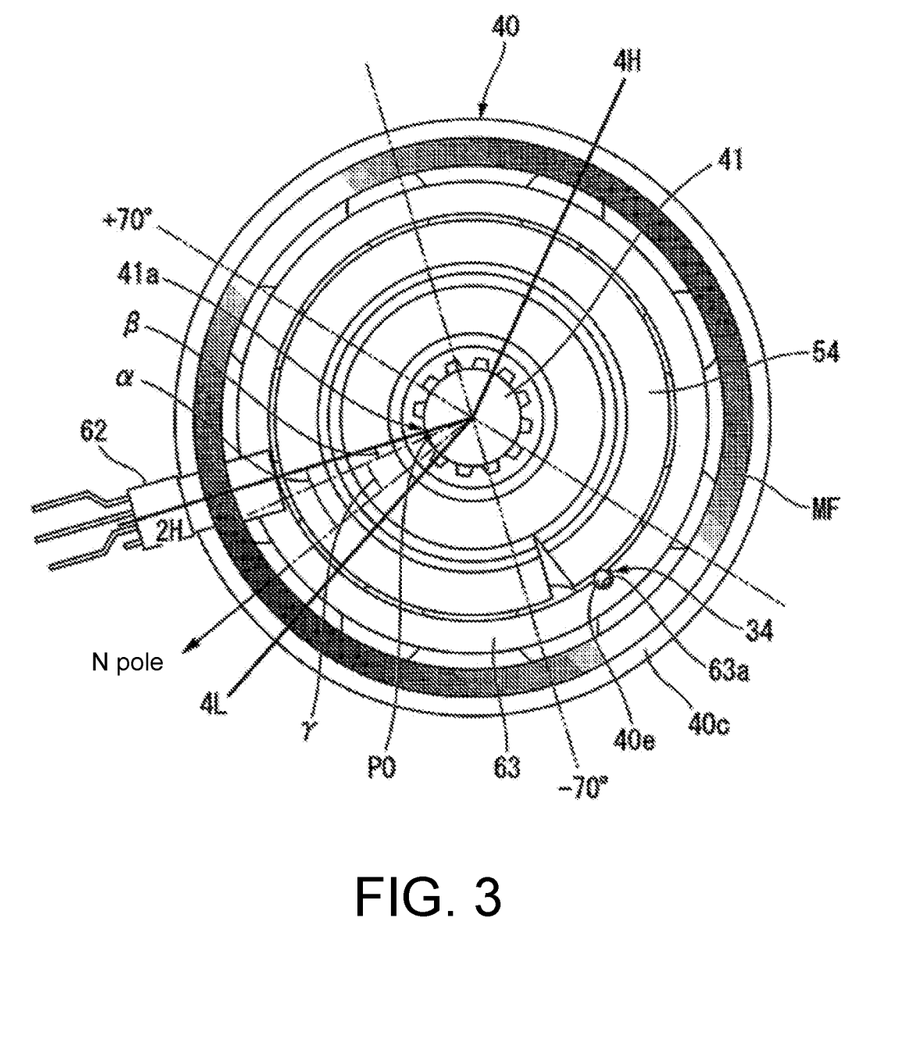
FIG. 3 is a diagram for operational description of an angle detection device.

FIG. 3 is a plane view obtained by viewing the first magnet 63 and the output part 40 from the one side in the axial direction. In FIG. 3, magnetic flux density distribution MF of a magnetic field generated by the first magnet 63 is expressed on the outer side of the first magnet 63 in the radial direction. Note that the magnetic flux density distribution MF is magnetic flux density distribution of the first magnet 63f in the axial direction on the surface thereof on the one side in the axial direction.

As illustrated in FIG. 3, the output part 40 has an angle reference position P0 on the outer circumferential surface of the output shaft part 41. In the case of present embodiment, the angle reference position P0 is the central position of a spline cut-out part 41a of the output shaft part 41 in the circumferential direction. The angle reference position P0 is an indicator indicating an angular position of the output shaft part 41 with respect to an external apparatus that is connected to the electric actuator 10. Thus, the angle reference position P0 may be a position of a line or a figure displayed in the output shaft part 41.

The first magnet 63 is disposed at a position at which the N pole of the first magnet 63 is shifted by an angle γ shown in FIG. 3 from the angle reference position P0 of the output part 40. The angle γ is set in accordance with the disposition of an angular position at which the output part 40 stops when the electric actuator 10 is used. The electric actuator 10 of the present embodiment will be described below exemplifying a case where a rotation control mechanism of a transfer device of a four wheel drive car is used.

Figure 4:
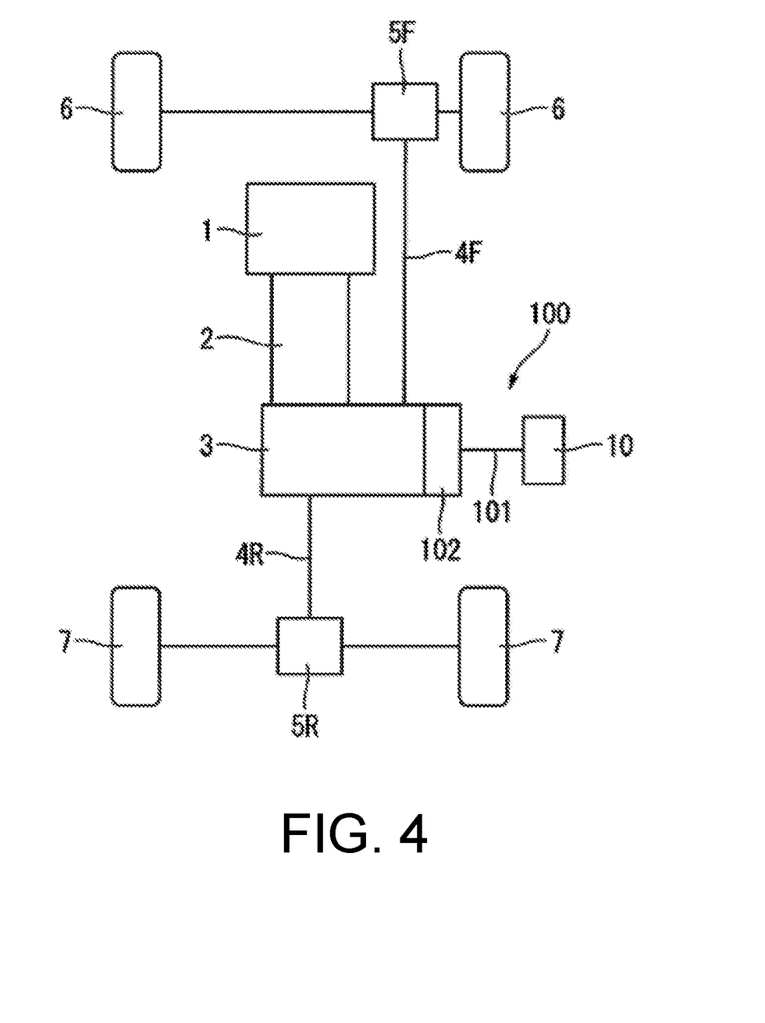
FIG. 4 is a diagram of a configuration of a four-wheel drive car with a transfer device.

FIG. 4 is a diagram of a configuration of a four-wheel drive car with a transfer device. The four-wheel drive car illustrated in FIG. 4 has an engine 1, a transmission 2, and a transfer device 3. The transfer device 3 is connected to a front differential 5F via the front propeller shaft 4F. The front differential 5F is linked to two front wheels 6 via axle shafts. The transfer device 3 is connected to a rear differential 5R via a rear propeller shaft 4R. The rear differential 5R is linked to two rear wheels 7 via axle shafts.

The transfer device 3 has a rotation control mechanism 100 that functions as a two-wheel/four-wheel drive switching machine. The rotation control mechanism 100 has the electric actuator 10, a control shaft 101 that is linked to the output shaft part 41 of the output part 40 of the electric actuator 10, and the operating part 102 that is linked to the control shaft 101. The operating part 102 executes a two-wheel/four-wheel switching operation for the transfer device 3 which is a control object in accordance with a posture of the control shaft 101.

The transfer device 3 can be switched to three drive modes of a first drive mode to a third drive mode. The first drive mode is a "2H mode" for two-wheel drive at a high speed gear. The second drive mode is a "4H mode" for four-wheel drive at a high speed gear. The third drive mode is a "4L mode" for four-wheel drive at a low speed gear.

The rotation control mechanism 100 switches a drive mode by causing the electric actuator 10 to rotatably drive the control shaft 101 and to stop the control shaft 101 at a predetermined angular position within one rotation. The control shaft 101 is rotatably driven among three positions including a "2H position" at which the transfer device 3 is switched to the 2H mode, a "4H position" at which the transfer device 3 is switched to the 4H mode, and a "4L position" at which the transfer device 3 is switched to the 4L mode. The operating part 102 executes control of the drive mode switch for the transfer device 3 when an angular position of the control shaft 101 coincides with the angular position corresponding to a switched drive mode.

FIG. 3 illustrates the portion of the first magnet 63 facing the first rotation sensor 62 when the control shaft 101 is disposed at the 2H position, the 4H position, and the 4L position. In the rotation control mechanism 100, the electric actuator 10 causes the output part 40 to rotate so that angular positions of the first magnet 63 each corresponding to the 2H position, the 4H position, and the 4L position coincide with positions thereof facing the first rotation sensor 62.

In the present embodiment, detection positions of the first magnet 63 at the 2H position, the 4H position, and the 4L position are set such that a portion of the first magnet 63 facing the first rotation sensor 62 is disposed at an angular position within 70° from the N pole or the S pole when the control shaft 101 stops at the 2H position, the 4H position, and the 4L position.

The angle reference position P0 relative to the case 11 is uniformly determined at each of the 2H position, the 4H position, and the 4L position of the control shaft 101. For example, FIG. 3 illustrates the state in which the control shaft 101 is disposed at the 2H position. At the 2H position, the angle reference position P0 is disposed at the position shifted by an angle β from the first rotation sensor 62 fixed to the case 11.

At this time, the first magnet 63 is positioned with respect to the output part 40 so that the angle α formed by the first rotation sensor 62 and the N pole of the first magnet 63 is in the range of the angle of 70°. Similarly to the case of the 2H position, positions of the first magnet 63 in cases of the 4H position, and the 4L position are set such that the angle formed by the first rotation sensor 62 and the N pole or the S pole of the first magnet 63 is in the range of the angle of 70° when the output part 40 is at a predetermined stop position.

In the example illustrated in FIG. 3, when the control shaft 101 is disposed at the 2H position, a portion thereof apart by an angle of 15° to 25° from the N pole of the first magnet 63 faces the first rotation sensor 62. When the control shaft 101 is disposed at the 4H position, a portion thereof apart by an angle of 20° to 30° from the S pole of the first magnet 63 faces the first rotation sensor 62. When the control shaft 101 is disposed at the 4L position, a portion thereof apart by an angle of 0° to 15° from the N pole of the first magnet 63 faces the first rotation sensor 62.

That is, since the interval between the 2H position and the 4L position is about the angle of 15° and thus the positions are relatively close and the 4H position is located substantially the opposite side of the 4L position, portions of the first magnet facing the first rotation sensor 62 at the 2H position and the 4L position are disposed close to the N pole, and a portion thereof facing the first rotation sensor 62 at the 4H position is disposed close to the S pole.

With the above-described configuration, at the time of an operation of the rotation control mechanism 100, it is possible to set the portion of the first magnet 63 facing the first rotation sensor 62 to a portion of the first magnet 63 having a high magnetic flux density. That is, since a portion of the first magnet 63 having a low magnetic flux density is not used in detection of an angle, it is better for the first magnet 63 to have magnetic field intensity that is detectable by the first rotation sensor 62 at a portion having a high magnetic flux density. Accordingly, even when a small magnet with a weak magnetic force is used as the first magnet 63, it is possible to detect an angular position of the output part 40 corresponding to each position of the control shaft 101 with high accuracy.

In addition, as described in the present embodiment, when the control shaft 101 stops at the 2H position, the 4H position, and the 4L position, if a portion of the first magnet 63 facing the first rotation sensor 62 is disposed at an angular position in the range of the angle of 35° from the N pole or the S pole, detection of an angle can be performed using a portion of the first magnet 63 having a higher magnetic flux density. Accordingly, improvement in angular position detection accuracy of the output part 40 and miniaturization of the first magnet 63 can be achieved.

The first wiring member 91 and the second wiring member 92 electrically connect the control board 70 and the first rotation sensor 62. The first wiring member 91 and the second wiring member 92 each have three wires. The first wiring member 91 is held in the motor case 12. The first wiring member 91 passes through the first wiring holding part 14. At least a part of the first wiring member 91 is embedded in the first wiring holding part 14. The first wiring member 91 is electrically connected to the control board 70 and the second wiring member 92. The second wiring member 92 is held in the speed reduction mechanism case 13. The second wiring member 92 passes through the second wiring holding part 15. At least a part of the second wiring member 92 is embedded in the second wiring holding part 15. The second wiring member 92 is electrically connected to the first rotation sensor 62 and the first wiring member 91. The first wiring member 91 and the second wiring member 92 are electrically connected when the motor case 12 is assembled with the speed reduction mechanism case 13.

Note that the disclosure is not limited to the above-described embodiment and can be modified and the like within the scope not departing from the gist of the disclosure, for example, as will be described below. For example, although the case where a ring magnet having two poles on a single side with respect to the circumferential direction is used as the first magnet 63 has been described in the present embodiment, a single-sided multiple-pole ring magnet having a plurality of N poles and S poles that are alternately disposed on a single side in the circumferential direction may be used as the first magnet 63. In addition, the first magnet 63 is not limited to having the annular shape and may be, for example, an arc-shaped magnet. In the case of the present embodiment, the portions of the first magnet 63 corresponding to the stop positions of the control shaft 101 (2H, 4H, and 4L illustrated in FIG. 3) are disposed in the range of the angle of 180°. Thus, an arc-shaped magnet having a length of the angle of 180° or more in the circumferential direction can be used as the first magnet 63.

Although the case where the positioning part 34 for positioning the first magnet 63 and the output part 40 has a fitting structure of the concave part 63a and the convex part 40e has been described in the present embodiment, the positioning part 34 may have a structure in which a convex part provided in the first magnet 63 fits to a concave part provided in the output part 40. In addition, a structure in which indicators such as lines or figures indicating reference positions of the first magnet 63 and the output part 40 are displayed on their surfaces and the indicator of the first magnet 63 is aligned with the indicator of the output part 40 may be employed.

In addition, each of configurations (constituent elements) described in the above embodiment, a modification example, a supplementary note, and the like may be combined, and addition, omission, substitution, other alteration of the configurations are possible within the scope not departing from the gist of the disclosure. In addition, the disclosure is not limited to the above-described embodiment and is limited only by the claims. Features of the above-described embodiments and the modifications thereof may be combined appropriately as long as no conflict arises.

What is claimed is:

1. An electric actuator, comprising:
   a motor, having a motor shaft that extends in an axial direction;
   a speed reduction mechanism that is linked to a portion of the motor shaft on one side in the axial direction;
   an output part to which rotation of the motor shaft is transmitted via the speed reduction mechanism; and
   a rotation detection device that detects rotation of the output part,
   wherein the output part extends in the axial direction and is disposed on the one side in the axial direction with respect to the motor shaft;
   the rotation detection device comprises:
     a magnet that is fixed to the output part and extends in a circumferential direction of the output part, and
     a rotation sensor that faces the magnet in the axial direction or a radial direction;
   the magnet has a plurality of magnetic poles disposed in the circumferential direction, and
   at least one magnetic pole of the magnet is disposed at a predetermined angular position with respect to an angle reference position of the output part in a rotation direction.

2. The electric actuator according to claim 1, further comprising:
   a positioning part that positions the magnet and the output part.

3. The electric actuator according to claim 2, wherein the positioning part comprises:
a concave part, provided on a surface of the magnet; and
a convex part, provided in the output part and inserted into the concave part.

4. The electric actuator according to claim 3, wherein the concave part is positioned in a region of the magnet having a relatively low magnetic flux density in the circumferential direction.

5. The electric actuator according to claim 1, wherein the magnet has only a pair of magnetic poles in the circumferential direction of the output part.

6. The electric actuator according to claim 1, wherein the magnet is a ring magnet formed of a single member.

7. A rotation control mechanism, comprising:
the electric actuator according to claim 2;
a control shaft that is linked to the output part of the electric actuator; and
an operating part that executes a different control operation with respect to a control object in accordance with a posture of the control shaft,
wherein the electric actuator is capable of switching the posture of the control shaft by stopping the output part at a plurality of angular positions within one rotation, and
the rotation sensor is disposed in a range of an angle of 70° with respect to a magnetic pole of the magnet at the plurality of angular positions at which the output part stops.

8. A rotation control mechanism, comprising:
the electric actuator according to claim 3;
a control shaft that is linked to the output part of the electric actuator; and
an operating part that executes a different control operation with respect to a control object in accordance with a posture of the control shaft,
wherein the electric actuator is capable of switching the posture of the control shaft by stopping the output part at a plurality of angular positions within one rotation, and
the rotation sensor is disposed in a range of an angle of 70° with respect to a magnetic pole of the magnet at the plurality of angular positions at which the output part stops.

9. A rotation control mechanism, comprising:
the electric actuator according to claim 4;
a control shaft that is linked to the output part of the electric actuator; and
an operating part that executes a different control operation with respect to a control object in accordance with a posture of the control shaft,
wherein the electric actuator is capable of switching the posture of the control shaft by stopping the output part at a plurality of angular positions within one rotation, and
the rotation sensor is disposed in a range of an angle of 70° with respect to a magnetic pole of the magnet at the plurality of angular positions at which the output part stops.

10. A rotation control mechanism, comprising:
the electric actuator according to claim 1;
a control shaft that is linked to the output part of the electric actuator; and
an operating part that executes a different control operation with respect to a control object in accordance with a posture of the control shaft,
wherein the electric actuator is capable of switching the posture of the control shaft by stopping the output part at a plurality of angular positions within one rotation, and
the rotation sensor is disposed in a range of an angle of 70° with respect to a magnetic pole of the magnet at the plurality of angular positions at which the output part stops.

11. The rotation control mechanism according to claim 10, wherein
the rotation sensor is disposed in the range of the angle of 35° with respect to the magnetic pole of the magnet at the plurality of angular positions at which the output part stops.

* * * * *